United States Patent [19]

Sparks

[11] 4,362,215
[45] Dec. 7, 1982

[54] MARINE RISER PROVIDED WITH A HINGED FOOT FOR OFFSHORE HYDROCARBON PRODUCTION

[75] Inventor: Charles Sparks, Le Vesinet, France

[73] Assignee: Institut Francais Du Petrole, Rueil-Malmaison, France

[21] Appl. No.: 210,963

[22] Filed: Nov. 28, 1980

[30] Foreign Application Priority Data

Nov. 30, 1979 [FR] France ............................ 79 29723

[51] Int. Cl.³ .................. E21B 17/01; E21B 33/038; E21B 43/013
[52] U.S. Cl. .............................. 166/367; 166/345; 166/346; 166/351; 285/137 R
[58] Field of Search .............. 166/367, 359, 351, 352, 166/355, 346, 345; 285/18, 24, 27, 137 R

[56] References Cited

U.S. PATENT DOCUMENTS

| | | | |
|---|---|---|---|
| 3,189,098 | 6/1965 | Haeber | 166/368 X |
| 3,189,099 | 6/1965 | Otteman et al. | 166/368 |
| 3,426,843 | 2/1969 | Visser | 166/358 X |
| 3,701,551 | 10/1972 | Morgan | 166/359 X |
| 3,718,183 | 2/1973 | Scott | 166/346 X |
| 3,913,668 | 10/1975 | Todd et al. | 166/359 |
| 4,031,919 | 6/1977 | Ortloff et al. | 285/137 R X |
| 4,046,407 | 9/1977 | Porreco | 285/133 R |
| 4,068,868 | 1/1978 | Ohrt | 285/263 |
| 4,279,544 | 7/1981 | Brun et al. | 166/346 X |

FOREIGN PATENT DOCUMENTS

| | | |
|---|---|---|
| 2376987 | 8/1978 | France . |
| 2377570 | 8/1978 | France . |
| 2399609 | 3/1979 | France . |
| 1285530 | 8/1972 | United Kingdom . |

Primary Examiner—Stephen J. Novosad
Attorney, Agent, or Firm—Millen & White

[57] ABSTRACT

This riser has a central pipe connected to an underwater installation through a flexible assembly, and a plurality of satellite pipes connected to corresponding tubes of the underwater installation through a plurality of hoses each arranged along an helical winding. Upper and lower fastening means secure these hoses to the upper and lower parts of the flexible assembly and maintain the ends of each connecting hose in the extension of the helical winding.

12 Claims, 8 Drawing Figures

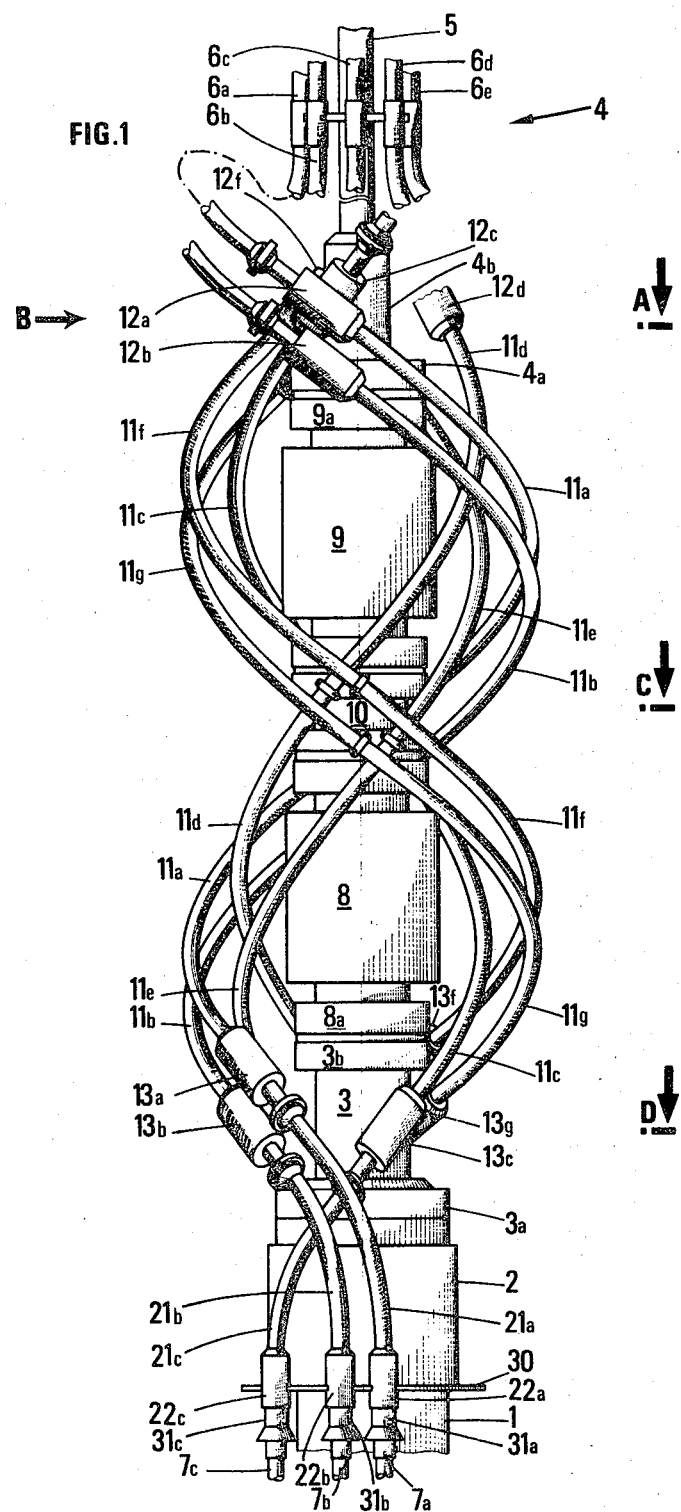

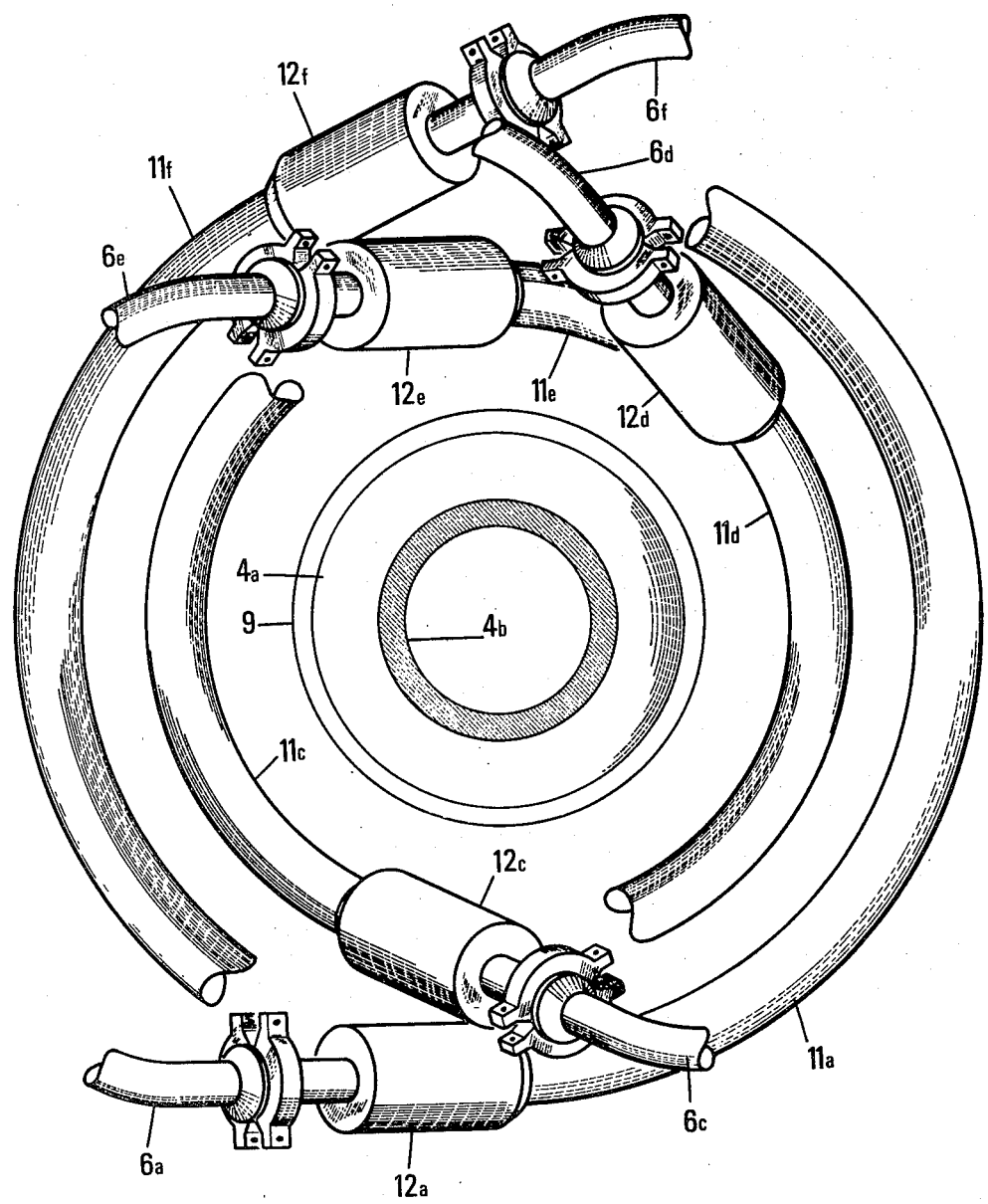

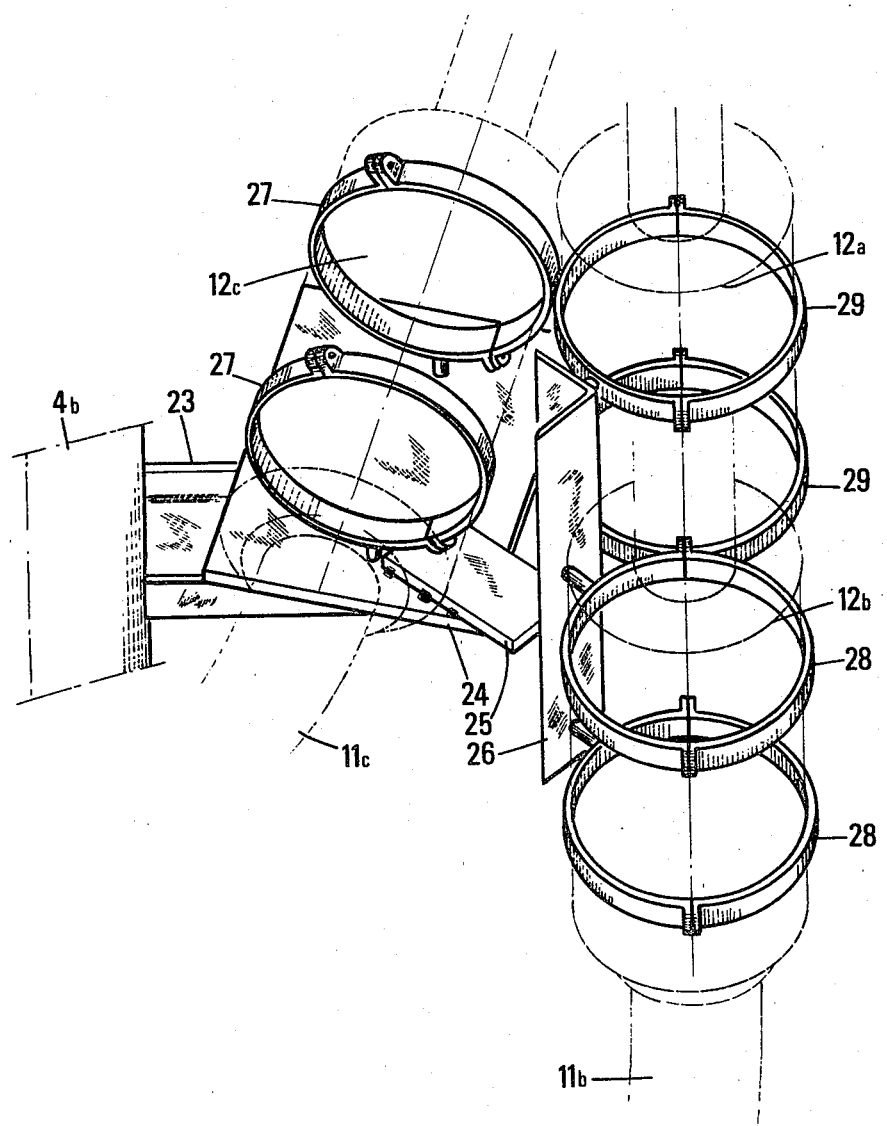

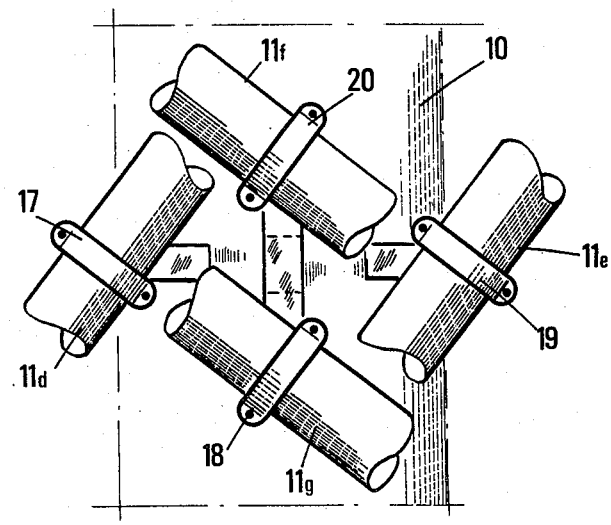
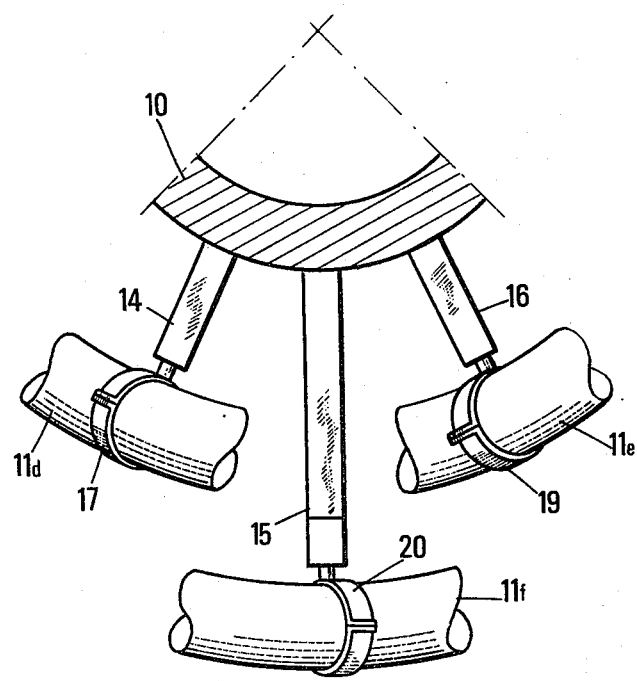

MARINE RISER PROVIDED WITH A HINGED FOOT FOR OFFSHORE HYDROCARBON PRODUCTION

BACKGROUND OF THE INVENTION

The present invention relates to a marine riser with a hinged foot suitable for offshore hydrocarbon production.

The prior art marine risers which are conventionally used to connect an underwater oil installation (such as a wellhead, an underwater manifold, etc) to a production platform located at the water surface, comprise a central pipe equipped with a plurality of satellite pipes. A first group of these satellite pipes consists of the production pipes through which the hydrocarbons flow upwardly to the production platform. Through the central pipe of the riser, the hydrocarbons can be reinjected from the platform into one or several oil or gas conveying pipes. A second group of satellite pipes of the marine riser is made up of water injection pipes, or/and of pipes for injecting gas under pressure from the platform, so as to maintain a sufficient pressure in the hydrocarbon deposit.

A third series of satellite pipes of the riser column is made up by the servicing pipes which permit application of a lifting pressure to instruments or tools which are pumped in a counter-current direction relative to the production fluid through the pipes of said first series of satellite pipes, according to the Through Flow Line (T.F.L.) method.

Connection of such a riser column to the water bottom raises difficult problems.

British Patent Specification No. 1,285,530 describes a riser column having satellite pipes helically wound around a central pipe and secured thereto. Such a riser column does not allow important variations in the position of the floating installation and thus, is not suitable for use at water depths which may reach or even exceed 300 meters.

For this application there have been proposed riser columns equipped with a flexible assembly, comprising for example flexible coupling or "flex-joints" which permit substantial displacement of the floating installation.

In this type of installation it is however, necessary to provide means for preventing the satellite pipes from being subjected to excessive stresses likely to break them, as a result of the riser bending.

To solve this problem U.S. Pat. No. 3,701,551 proposes deforming each satellite pipe at the level of articulation of the riser column to form a loop which is substantially contained within a vertical plane.

This solution is not applicable to the riser columns which are contemplated at present, since such columns will include about twenty or even more satellite pipes.

As a matter of fact, the bulkiness of the so-formed loop would be prohibitive. Moreover, the stresses developed in these loops would still be excessive for the loops which are not contained in the bending plane or the riser column.

Another solution has been proposed in FRENCH Pat. No. 2,377,570, consisting in the provision of universal or Cardan coupling on the riser column, and in the deformation of each satellite pipe along two spirals coaxial to the two articulation axes.

As in the above solution, this embodiment is not suitable for a riser column comprising a high number of satellite pipes.

Moreover it is difficult to ensure continuity of the central pipe of the riser column when two sections of this pipe are hingedly connected to each other by means of a universal coupling.

It is known to helically wind the satellite pipes around the central pipe of a riser column so as to permit substantial displacement of the free lower end of these satellite pipes, and to facilitate their connection to corresponding pipes secured to the wellhead (FRENCH Pat. No. 2,399,609 and U.S. Pat. No. 3,189,098), or to permit relative sliding movement of two consecutive sections of the central pipe, with a view toward compensating for vertical movements of the floating installation (U.S. Pat. No. 3,718,183). In all cases the helical portions of the satellite pipes are extended by bent tube sections which are connected to the satellite pipes and are secured to the central pipe. It would thus seem possible to adapt such a technique to a riser column whose central pipe is provided with a flexible coupling or flex-joint. This solution is described in FRENCH Pat. No. 2,376,987 and in U.S. Pat. Nos. 3,913,668 and 4,046,407 which relate to rigid satellite pipes.

However, experience has shown that the bent portions of the satellite pipes then withstand the highest stresses, and that these stresses become prohibitive for high inclinations of the riser column. It has also been ascertained that upon bending of this column, the helical portions of the satellite pipes are deformed until they come into abutment against each other.

It is also known from U.S. Pat. Nos. 3,426,843 and 4,031,919 to substitute for the rigid satellite pipes, helical hoses arranged substantially helically around the flexible assembly at the lower part of the riser column and which are directly connected to the rigid satellite pipes arranged substantially parallel to the axis of the central pipe. Tests have shown that high mechanical stresses were developed at the level of these connections and that for high bending angles of the riser, the corresponding deformations in the profiles of the flexible hoses lead to entangling of these flexible pipes.

Most of the presently available flexible riser columns suitable for average depths (150 to 300 meters) are not capable, in the absence of special operating steps, of withstanding the extreme operating conditions which may be encountered during a working life of about 20 years. Such special operations may in particular consist of disconnecting or even of lifting the riser assembly.

Moreover, in the prior art riser columns, the angular rotation induced at the foot of the column by these extreme operations exceeds the capacity of the flexible couplings (flex-joints) and/or of the satellite pipes.

As a matter of fact, different recent studies have shown that the angular movement induced at the articulated foot of a production riser column under extreme conditions may exceed 10°, this value representing the limit of the angular movements of ball and socket joints and flexible couplings (flex-joint) which are available at present. Other studies have shown that the hydrocarbon deposits whose exploitation from a floating support can be expected in a near future will require the use of a riser column equipped with about twenty satellite pipes used as production, fluid injection and servicing pipes.

SUMMARY OF THE INVENTION

The object of the present invention is to provide a riser column having an articulated foot which may comprise a large number of satellite pipes (about twenty or more) and can withstand extreme conditions (centenary conditions) capable in particular, to cause an inclination of the riser column of up to 20° relative to a vertical line.

Another object of the invention is to provide a foot of a riser column whose positioning and maintenance can be easily performed without the help of divers.

This object can be achieved according to the invention by using a marine riser having a hinged foot for offshore hydrocarbon production, suitable for connecting an underwater installation to a production platform, and comprising a central pipe provided with a plurality of satellite pipes and a flexible assembly for connecting the riser to the underwater installation, associated with a plurality of flexible connecting hoses, each of which is arranged around said connecting assembly substantially along a helical winding, said connecting hoses connecting said satellite pipes to corresponding tubes equipping the underwater installation, this riser comprising upper and lower means for securing said connecting hoses to said flexible assembly, said securing means being respectively integral with the upper and the lower parts of said flexible assembly and maintaining the extremities of each connecting hose oriented in the extension of said helical winding.

According to a specific embodiment the connecting assembly comprises at least two serially connected flexible couplings and intermediate connection means for securing the connecting hoses to the flexible assembly between the flexible couplings.

BRIEF DESCRIPTION OF THE DRAWINGS

A non-limitative embodiment of the invention is illustrated by the accompanying drawings, wherein:

FIG. 1 is a front view of an articulated foot of a riser column according to the invention, FIG. 1A is a view from above, partially in cross-section along line A of FIG. 1, showing on a larger scale the arrangement of the flexible hoses around the upper flexible coupling, without showing the anchoring means of these hoses at this level, FIG. 1B is a view from the left side at the level indicated by the arrow B in FIG. 1 showing on a larger scale, the anchoring means for the flexible hoses above the upper flexible coupling, FIG. 1C is a partial enlarged view of a cross-section, along line C of FIG. 1, and showing intermediate connecting means for securing the flexible hoses to the riser column between the two flexible couplings, FIG. 2 is the corresponding front view of FIG. 1C at the same level, FIGS. 3, 4 and 5 diagrammatically illustrate in cross-sections, respectively at the levels A, C and D FIG. 1, of the helical winding of the different flexible hoses shown in FIG. 1, on two coaxial cylindrical surfaces.

DETAILED DISCUSSION OF THE INVENTION

Figure 3:
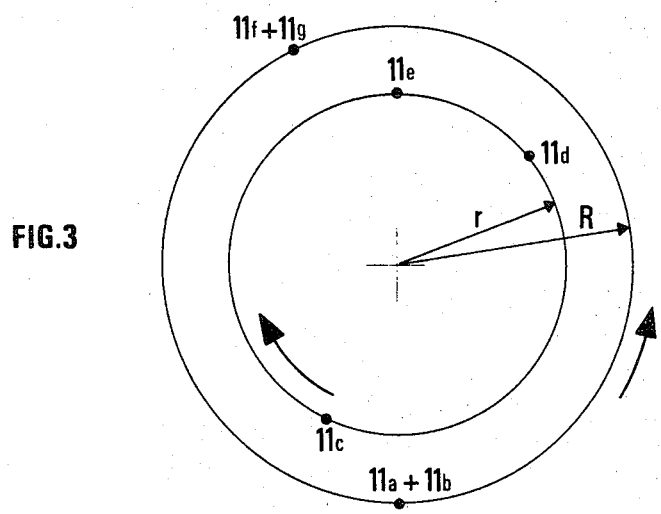

In the embodiment illustrated by way of example there is shown, for the sake of clarity, a riser column which comprises only a small number of satellite pipes, but it must be understood that the invention is also applicable with a higher number of satellite pipes of for example, twenty or more.

In the drawings reference 1 designates an underwater installation equipped with a hydraulic connector 2.

The reference 4 designates the central part of a production riser column which comprises a central pipe 5, provided with a plurality of satellite pipes 6a, 6b... etc, which must be connected to corresponding pipes 7a, 7b ... etc ... of the underwater installation 1. These satellite pipes are secured in a known manner to the central pipe 5.

A flexible connection assembly located at the lower part of the riser column 4 is arranged between a flange 4a at the bottom of this column and a flange 3a at the bottom of an element 3 connecting the central pipe 5 to the hydraulic connector 2. The element 3 is provided with a flange 3b at its end opposite to the flange 3a.

This connecting assembly comprises two flexible couplings or "flex-joints" 8 and 9 arranged in series and separated by an intermediate element 10 to which they are connected by flanges. The extremities of this assembly comprise the flanges 8a and 9a respectively connected to flanges 3b and 4a.

The flexible couplings can be of the type known for example, from U.S. Pat. No. 4,068,868.

The connecting assembly also comprises a plurality of flexible connecting hoses 11a to 11g adapted to connect the satellite pipes 6a ... 6e to the corresponding pipes 7a ... 7c of the wellhead.

These hoses will for example consist of flexible armoured pipes of the type described in the OTC Publication No. 2196 (Offshore Technology Conference 1977) with special reference to FIG. 1 of this publication.

The hoses are wound in high pitch helices around the flexible connecting assembly.

The radius of curvature of the hoses 11a to 11g will preferably be sufficient to permit circulation of pumped tools or instruments through some of these hoses, according to the TFL method (Through Flow Line Method) which is well known in the art.

Figure 4:
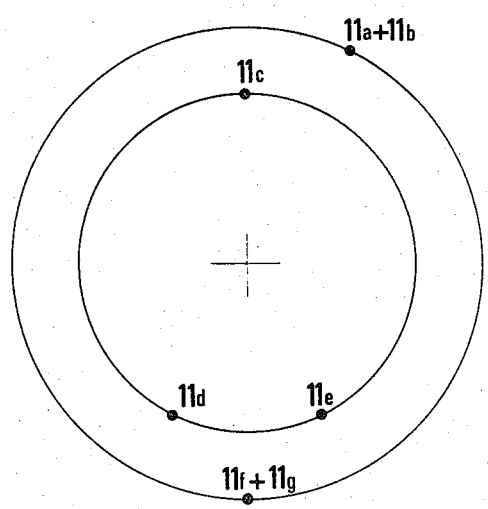
Figure 5:
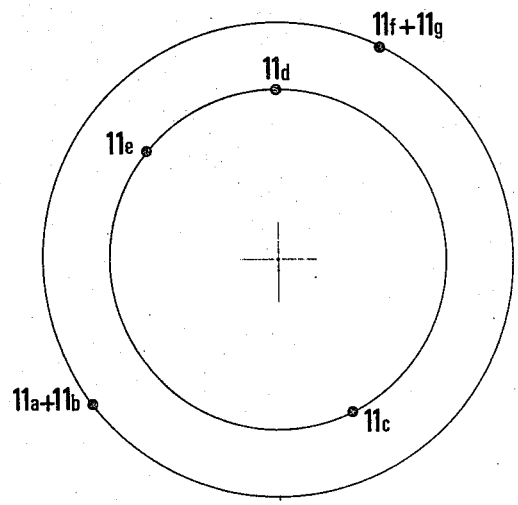

In the illustrated embodiment, the flexible hoses 11a to 11g are distributed in two helices inscribed on two cylindrical surfaces of different radii (r and R) with opposite winding pitches on these two surfaces, these helices being preferably coaxial as shown in FIGS. 3 to 5.

The number of the flexible hoses 11a, 11b.... etc ... is equal to the number of satellite pipes 6a, 6b ... etc . .. of the riser column to which these hoses are secured by connectors 12a, 12b... etc ... The connection does not appear in the upper part of FIG. 1, wherein the central pipe 5 and the satellite pipes 6a, 6b, etc ... are shown in dotted line. This connection is achieved through bent pipe sections secured to the lower part of the satellite pipes, these pipe sections being coupled to the connectors 12a, 12b... etc ...

The connectors 12a, 12b ... etc ... are anchored above the upper flex-joint 9 by upper securing means, not shown in FIGS. 1 and 1A of the drawing for the sake of clarity.

These securing means will be described below in more detail with reference to FIG. 1B.

At their lower end, the flexible gain pipes 11a to 11g similarly comprise connectors 13a, 13b... etc ... which are anchored to the connecting element 3, below the lower flex-joint 8, by lower securing means not shown in FIG. 1.

Intermediary securing means for the flexible hoses 11a to 11g equip the element 10.

These securing means, not shown in FIG. 1, may comprise (FIGS. 1C and 2) securing arms, such as 14, 15 and 16 whose extremities are provided with securing tubular elements or pipe-clamps 17 to 20, so arranged that their axes are tangent to the helical profile of the connecting hoses.

Thus the upper and lower securing means at the ends of the helically wound section of the connecting hoses are oriented in the extension of said helical profile.

The tests have shown that, under these conditions, the stresses supported by the flexible hoses along their helical section are minimal and permit a high inclination angle of the riser column, without substantially changing the spacing between two adjacent hoses.

As shown in FIG. 1B, the connectors 12a, 12b... etc ... may be made integral with element 4b, itself connected to the flange 4a, through an assembly of connecting flanges and cross-bracing members such as 23, 24, 25 and 26 which are welded to one another and to the element 4b, with appropriate orientations, these connecting flanges and cross bracing members carrying clamping collars 27, 28 and 29.

A similar connection system can be used for the lower connectors 13a, 13b... etc... permitting connection of the flexible hoses 11a to 11g to the pipes 7a, 7b ... etc ... which equip the underwater installation 1, through incurved rigid extension pipes 21a, 21b ... etc ... whose lower part is fitted with mouthpieces 22a, 22b ... etc ... for connection to the pipes 7a, 7b ... etc ...

These mouthpieces secured to a ring 30 integral with the hydraulic connector 2 may be of a conventional type whose connection can be achieved by simple guiding ("stab connectors"), which will facilitate positioning and maintenance of the riser column. It is obviously possible, without departing from the scope of the present invention to substitute for these extension pipes flexible pipe sections or extensions of the flexible connecting hoses, provided such pipe sections or extensions are held by securing means in the extension of the helical windings of the flexible hoses.

It results from the foregoing that the flexible pipe sections comprised between the lower securing means and the connecting mouthpieces are not subjected to any substantial stress when the riser column is bent.

By guiding the lowering of this riser column it will be possible to engage the mouthpieces 22a, 22b ... etc ... into corresponding mouthpieces 31a, 31b ... etc ... of the pipes 7a, 7b which equip the underwater installation 1, without requiring the help of divers.

The embodiment illustrated in FIG. 1 offers the advantage of permitting a substantial inclination of the foot of the riser column (this inclination can reach 20° when the flex-joints 8 and 9 each separately permit a maximum inclination of 10°). It will be possible to place more than two flexible couplings or flex-joints above one another, using intermediary securing means between consecutive flex-joints for the helices formed by the flexible hose 11a to 11g, such as those shown in FIGS. 1C and 2, provided these securing means hold the flexible connecting hoses along their helical outline.

It will also be possible to inscribe the flexible connecting hoses on more than two helices of different radii, so that the number of these flexible hoses can be increased.

What is claimed is:

1. A marine riser having a hinged foot, for offshore hydrocarbon production, adapted for connecting an underwater installation to a production platform, said riser comprising a central pipe provided with a plurality of satellite pipes, and a flexible assembly, for connecting the riser to the underwater installation, associated with a plurality of flexible connecting hoses each of which is arranged around said flexible connecting assembly in a substantially helical winding arrangement, and said flexible connecting hoses arranged for connecting said satellite pipes to corresponding tubes on the underwater installation, and upper securing means and lower securing means for securing said connecting hoses to said flexible connecting assembly, said upper and lower securing means being respectively integral with the upper and lower parts of said flexible assembly and arranged for maintaining the extremities of each flexible connecting hose oriented in the extension of said helical winding arrangement.

2. A marine riser according to claim 1, wherein said securing means for each flexible connecting hose comprises one tubular element whose axis is oriented in the extension of said helical winding.

3. A marine riser according to claim 2, wherein said upper securing means connect each of said flexible connecting hoses with a respective satellite pipe, and a portion of each of said satellite pipes being bent so that its extremity is located in the extension of said helical winding arrangement.

4. A marine riser according to claim 3, wherein said lower securing means comprises bent pipes coupled at their upper end to said flexible connecting pipes, and connected at their lower end to said pipes equipping the underwater installation by means of connecting mouthpieces anchored at the lower part of the connecting assembly.

5. A marine riser according to claim 1, wherein said connecting hoses comprise a plurality of hoses arranged along separate helices inscribed on cylindrical surfaces having different radii.

6. A marine riser having a hinged foot, for offshore hydrocarbon production, adapted for connecting an underwater installation to a production platform, said riser comprising a central pipe provided with a plurality of satellite pipes, and a flexible assembly, for connecting the riser to the underwater installation, associated with a plurality of flexible connecting hoses each of which is arranged around said flexible connecting assembly in a substantially helical winding arrangement, said flexible connecting assembly comprising at least two serially connected flexible joints, and said flexible connecting hoses arranged for connecting said satellite pipes to corresponding tubes on the underwater installation, upper securing means and lower securing means being respectively integral with the upper and lower parts of said flexible connecting assembly and arranged for maintaining the extremities of each flexible connecting hose oriented in the extension of said helical winding arrangement, and intermediate securing means for securing said flexible connecting hoses to said riser at a location between said flexible joints.

7. A marine riser according to claim 6, wherein said securing means for each flexible connecting hose comprises one tubular element whose axis is oriented in the extension of said helical winding.

8. A marine riser according to claim 7, wherein said upper securing means connect each of said flexible connecting hoses with a respective satellite pipe, and a portion of each of said satellite pipes being bent so that its extremity is located in the extension of said helical winding arrangement.

9. A marine riser according to claim 8, wherein said lower securing means comprise bent pipes coupled at their upper end to said flexible connecting hoses, and connected at lower end of said flexible connecting hoses to said pipes equipping the underwater installation by means of connecting mouth-pieces anchored at the lower part of the connecting assembly.

10. A marine riser according to claim 6, wherein said flexible connecting hoses comprise a plurality of hoses arranged along separate helices inscribed on cylindrical surfaces having different radii.

11. A marine riser having a hinged foot, for offshore hydrocarbon production, adapted for connecting an underwater installation to a production platform, said riser comprising a central pipe provided with a plurality of satellite pipes, and a flexible connecting assembly, for connecting the riser to the underwater installation, associated with a plurality of flexible connecting hoses each of which is arranged around said flexible connecting assembly in a substantially helical winding arrangement, and said flexible connecting hoses arranged for connecting said satellite pipes to corresponding tubes on the underwater installation and having a radius of curvature sufficient to permit passage of pumped tools therethrough, and upper securing means and lower securing means for securing said connecting hoses to said flexible connecting assembly, said upper and lower securing means being respectively integral with the upper and lower parts of said flexible connecting assembly and arranged for maintaining the extremities of each flexible connecting hose oriented in the extension of said helical winding arrangement.

12. A marine riser according to claim 11, wherein said flexible connecting hoses comprise a plurality of hoses arranged along separate helices inscribed on cylindrical surfaces having different radii.

* * * * *